United States Patent [19]
Alary et al.

[11] Patent Number: 5,528,896
[45] Date of Patent: Jun. 25, 1996

[54] GAS-FLOW SEPARATOR FOR A DOUBLE DOME GAS TURBINE ENGINE COMBUSTION CHAMBER

[75] Inventors: Jean-Paul D. Alary, St Maur des Fosses; Michel A. A. Desaulty, Vert Saint Denis; Joé L. Jamet, Bourron Marlotte; Denis J. M. Sandelis, Nangis; Pierre M. V. Schroer, Brunoy, all of France

[73] Assignee: Societe Nationale D'Etude et de Construction de Moteurs D'Aviation (S.N.E.C.M.A.), Paris, France

[21] Appl. No.: 337,537

[22] Filed: Nov. 9, 1994

[30] Foreign Application Priority Data

Nov. 10, 1993 [FR] France ................................ 93 13408

[51] Int. Cl.⁶ ................................ F23R 3/04; F23R 3/50
[52] U.S. Cl. ................................ 60/39.36; 60/747
[58] Field of Search ........................ 60/39.36, 733, 60/737, 746, 747, 748, 752, 755, 756, 757

[56] References Cited

U.S. PATENT DOCUMENTS

| | | | |
|---|---|---|---|
| 4,058,977 | 11/1977 | Markowski et al. | 60/737 |
| 4,246,758 | 1/1981 | Caruel et al. | 60/747 |
| 4,903,492 | 2/1990 | King | 60/737 |
| 5,197,278 | 3/1993 | Sabla et al. | 60/733 |
| 5,197,289 | 3/1993 | Glevicky et al. | 60/746 |
| 5,220,795 | 6/1993 | Dodds et al. | 60/757 |
| 5,284,019 | 2/1994 | Vdoviak | 60/747 |
| 5,311,743 | 5/1994 | Ansart et al. | 60/752 |
| 5,321,951 | 6/1994 | Falls et al. | 60/748 |
| 5,375,420 | 12/1994 | Falls et al. | 60/747 |
| 5,417,069 | 5/1995 | Alary et al. | 60/756 |
| 5,421,158 | 6/1995 | Stenger et al. | 60/747 |
| 5,479,772 | 1/1996 | Halila | 60/757 |

FOREIGN PATENT DOCUMENTS 509176  10/1992  European Pat. Off. .

*Primary Examiner*—Timothy S. Thorpe
*Attorney, Agent, or Firm*—Bacon & Thomas

[57] ABSTRACT

A gas flow separator for an annular combustion chamber of a gas turbine engine is disclosed in which the radially spaced apart first and second gas flow separator walls which extend axially into the combustion chamber from the combustion chamber upstream end wall each define a plurality of axially extending channels. Each of the channels extends generally axially in an upstream direction from the downstream edge of each of the separator walls such that their axial lengths are less than the axial lengths of the respective separator walls. Both the depth and the width of each of the channels increases from its upstream end point to the downstream edges of the separator walls. The channels may be circumferentially aligned with each other, or the channels of one separator wall may be circumferentially offset from the channels of the other separator wall.

8 Claims, 8 Drawing Sheets

GAS-FLOW SEPARATOR FOR A DOUBLE DOME GAS TURBINE ENGINE COMBUSTION CHAMBER

BACKGROUND OF THE INVENTION

The present invention relates to a gas-flow separator for an annular combustion chamber of a gas turbine engine, more particularly such a gas flow separator that improves gas mixing and flame propogation within the combustion chamber.

To achieve a reduction in air pollution, recent aircraft gas turbine engines have been designed with annular combustion chambers having two sets of fuel injector heads, one fuel injector head utilized for idling or low-power operation, and both being utilized for full power operation. Each fuel injector head comprises a plurality of fuel injectors arranged in an annular array such that the fuel injectors are located in two distinct zones in the combustion chamber, the zones being separated by a gas flow separator.

Although this design has been generally successful, it suffers from several operational drawbacks. Specifically, when the idle or low-power fuel injection head is operating alone, the combustion chamber outlet temperatures may vary from 900° to 1,800° K. between the internal and external portions of the combustion chamber outlet and also between the roots and tips of the guide vanes located at the combustion chamber outlet. This temperature variation across the outlet and the guide vanes decreases the efficiency of the gas turbine engine. Also, when the two sets of fuel injectors are operating jointly, the known gas flow separators generate an essentially two-dimensional wake in the gas flow direction (from upstream to downstream) which also adversely affects the combustion chamber outlet temperatures.

SUMMARY OF THE INVENTION

A gas flow separator for an annular combustion chamber of a gas turbine engine is disclosed in which the radially spaced apart first and second gas flow separator walls which extend axially into the combustion chamber from the combustion chamber upstream end wall each define a plurality of axially extending channels. Each of the channels extends generally axially in an upstream direction from the downstream edge of each of the separator walls such that their axial lengths are less than the axial lengths of the respective separator walls. Both the depth and the width of each of the channels increases from its upstream end point to the downstream edges of the separator walls. The channels may be circumferentially aligned with each other, or the channels of one separator wall may be circumferentially offset from the channels of the other separator wall.

The first and second separator walls are joined at their downstream edges by a downstream end wall and their upstream edges by an upstream end wall so as to define a cavity therein. The upstream end wall of the separator is affixed to the upstream end wall of the combustion chamber such that the gas flow separator is located between the two arrays of fuel injectors. The channels may be formed in the separator walls by known forming processes, such as stamping, etc. The gas flow separator may be formed as an integral structure having an annular configuration extending about a longitudinal axis of symmetry of the annular combustion chamber.

The gas flow separator according to the present invention generates swirls in the gas flows within the combustion chamber, the axes of which are substantially parallel to the direction of gas flow, from upstream to downstream. Such swirls promote mixing of the gases within the combustion chamber thereby generating a more homogeneous gas temperature across the cross section of the combustion chamber and enhance the flame propagation when changing from idle or low power operation utilizing a single fuel injector array, to full power operation which utilizes both fuel injector arrays.

DETAILED DESCRIPTION OF THE PREFERRED EMBODIMENTS

Figure 1:
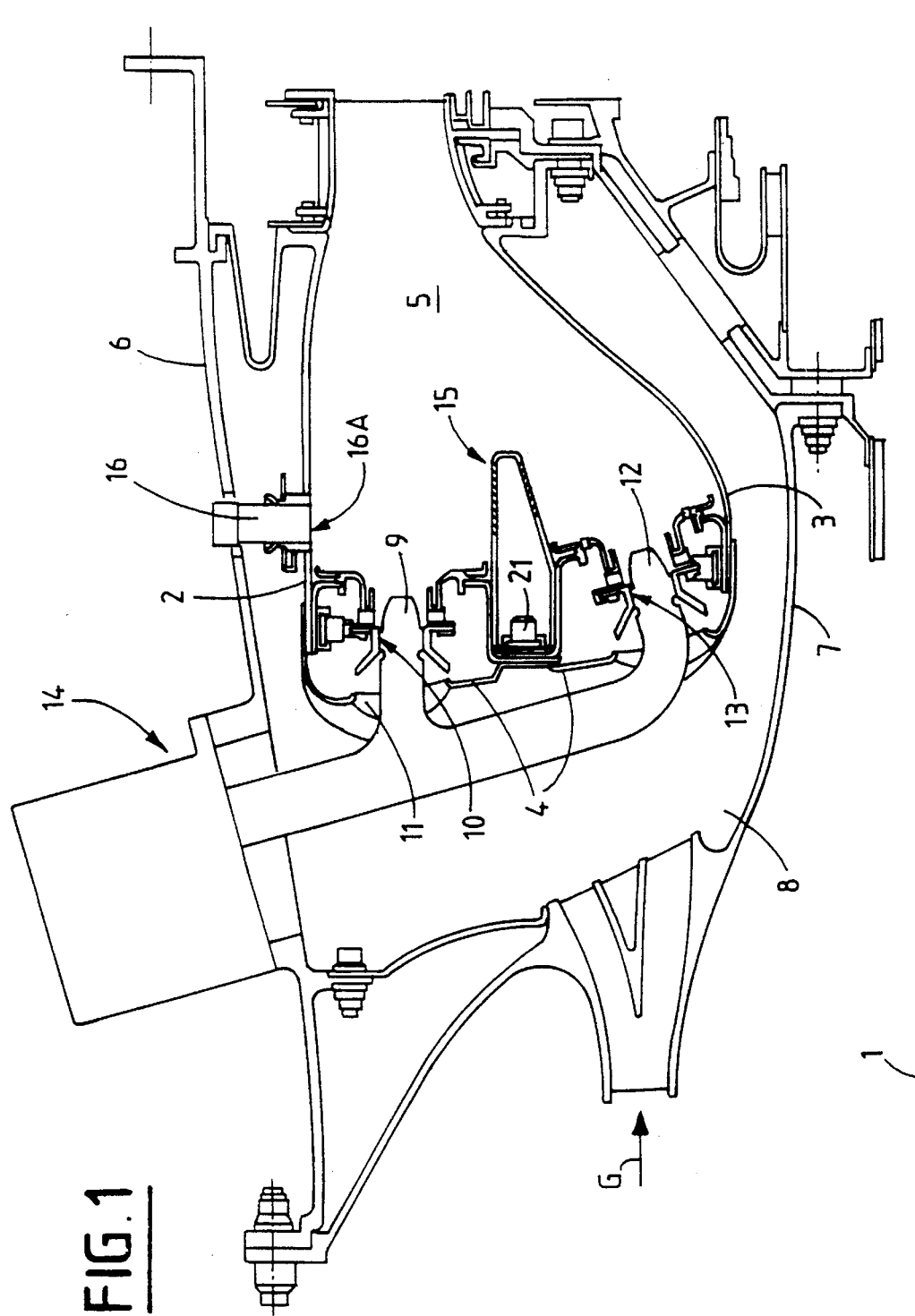
FIG. 1 is a partial, cross-sectional view of a gas turbine combustion chamber according to the present invention.

FIG. 1 illustrates an annular gas turbine engine combustion chamber having a longitudinal axis of symmetry 1, an outer annular combustion chamber wall 2 symmetrical about axis 1 and an inner combustion chamber annular wall 3, which is also symmetrical about the axis 1. A transverse upstream end wall 4 interconnects the upstream end portions of outer and inner combustion chamber walls 2 and 3 so as to bound the combustion chamber 5. This combustion chamber assembly is generally located within outer and inner annular casings 6 and 7, respectively, which are also symmetrical about the axis 1 and which define space 8 which is supplied with compressed air or oxidizer from the gas turbine compressor (not shown) in the direction of arrow G.

A first annular array of fuel injectors 9 extends about the axis 1, each fuel injector passing through a hole 10 and which co-operates in known fashion with air or oxidizer passages 11 formed in the upstream end wall to inject fuel and oxidizer into the combustion chamber 5 through the upstream end wall 4.

A second annular array of fuel injectors 12 also extends about the axis 1 such that the fuel injectors of the second array are located radially inwardly of the fuel injectors of the first array. Again, the fuel injectors 12 of the second array extend through holes 13 and inject fuel into the combustion chamber during full power aircraft operating conditions. Under such conditions, both the first and second arrays of fuel injectors inject fuel into the combustion chamber. Under idle or low-power operating conditions, only the first array of the fuel injectors 9 is operational.

A generally annular gas flow separator 15 is located between the arrays of fuel injectors 9 and 12 and extends about the axis 1. The gas flow separator 15 is attached to the upstream combustion chamber end wall 4 and extends from the upstream end wall into the combustion chamber in a generally downstream direction. Each of the fuel injector arrays 9 and 12 are connected in known fashion to a fuel supply source 14. Ignition of the fuel and oxidizer mixture within the combustion chamber 5 is achieved by spark plugs 16 mounted on the outer annular wall 2 such that the spark plug tips 16A are located within the combustion chamber 5.

Figure 2:
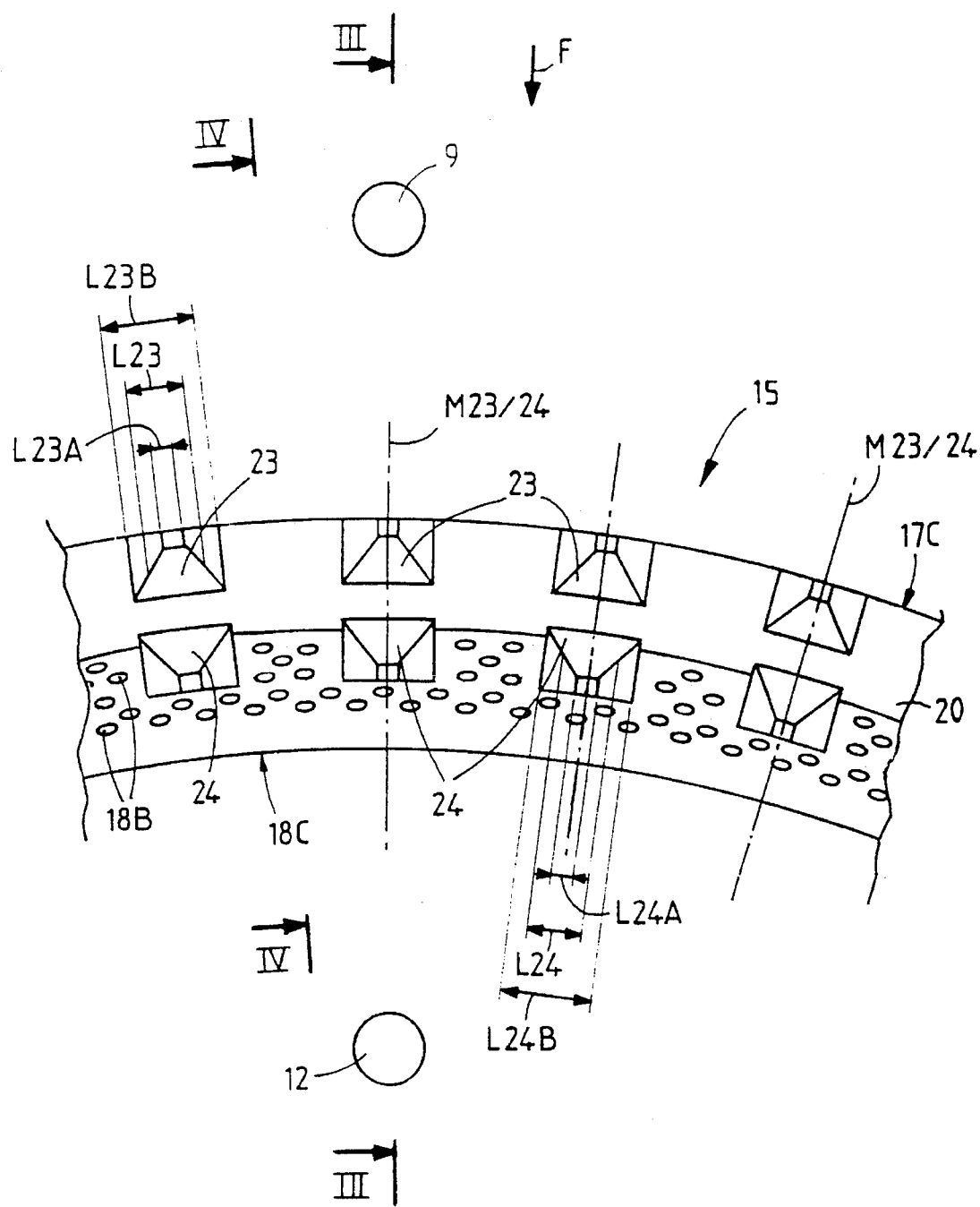
FIG. 2 is a partial, cross-sectional view taken along line 11—11 in FIG. 3 illustrating a first embodiment of the gas flow separator according to the present invention.
Figure 3:
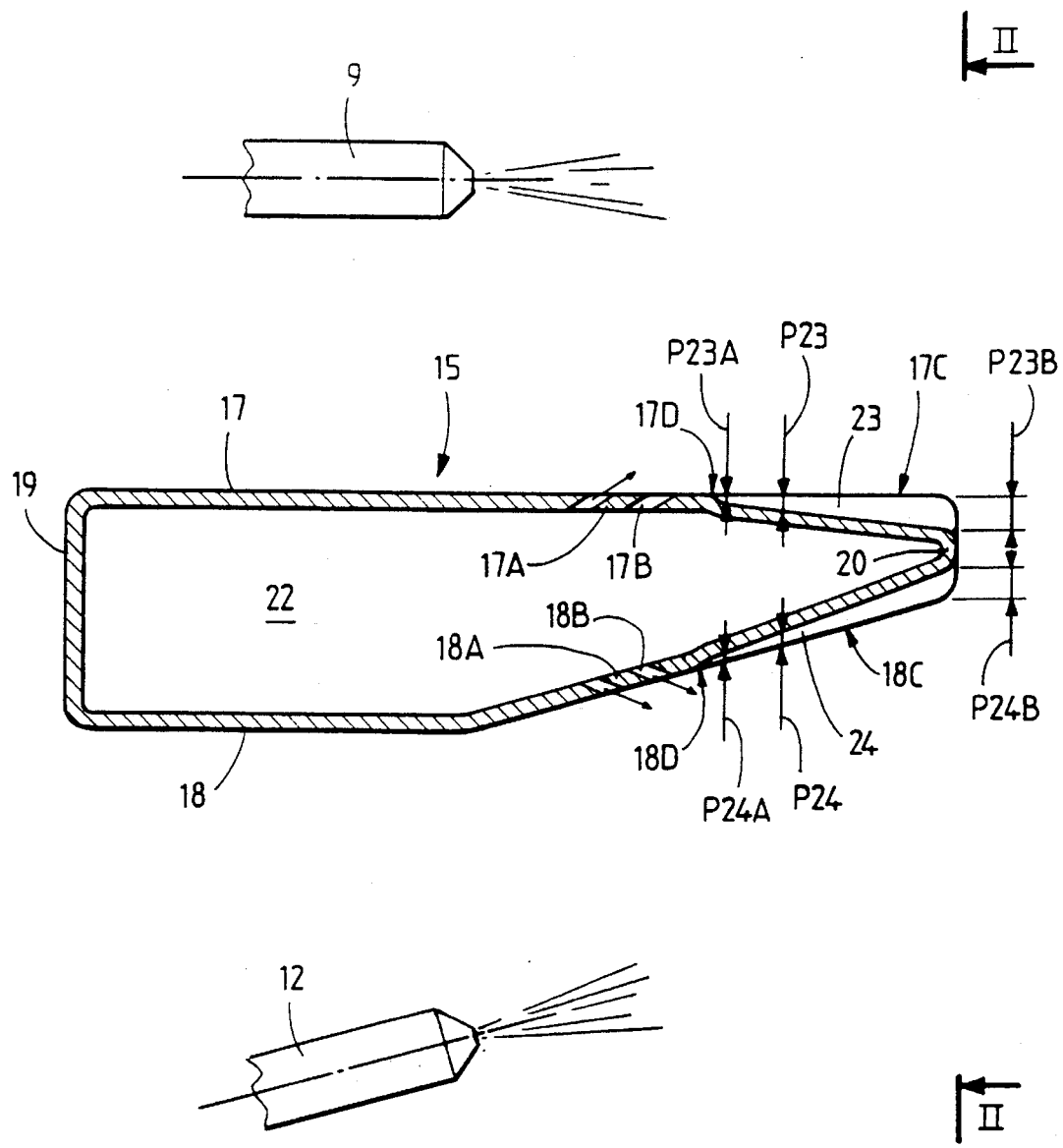
FIG. 3 is a partial, cross-sectional view taken along line 111—111 in FIG. 2.
Figure 4:
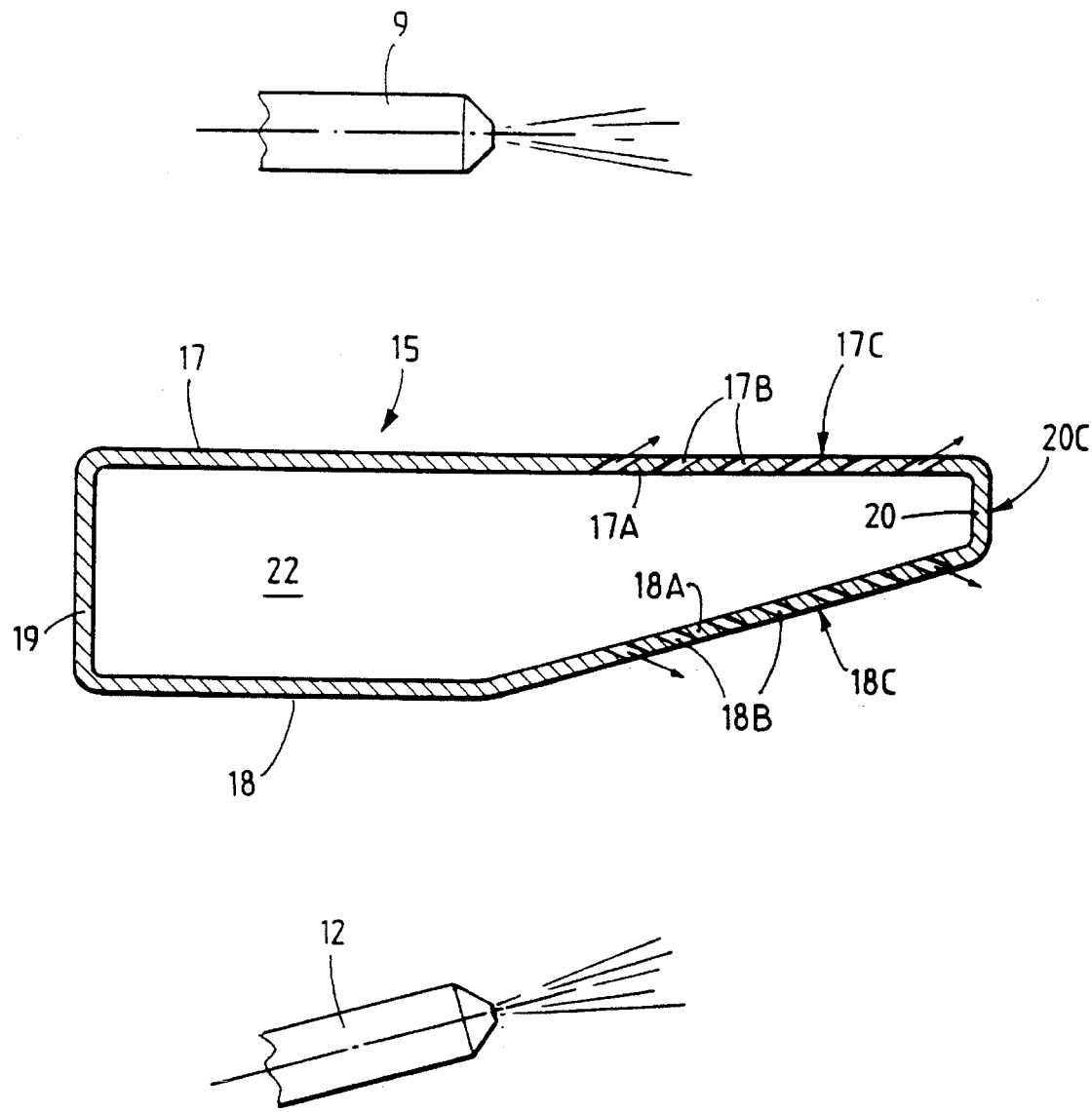
FIG. 4 is a partial, cross-sectional view taken along line IV—IV in FIG. 2.

FIGS. 2–4 illustrate a first embodiment of the gas flow separator 15 according to the present invention. As can be seen the gas flow separator 15 comprises an annular enclosure 22 bounded by an outer annular separator wall 17 which extends about the axis 1, an inner annular separator wall 8 which also extend about the axis 1 and is spaced inwardly from the wall 17, an upstream separator end wall 19 which connects the upstream ends of the inner and outer walls 17 and 18 and a downstream separator end wall 20 which connects the downstream edges of the outer and inner walls 17 and 18. The upstream separator wall 19 and the downstream wall 20 both extends substantially perpendicular to the axis 1. The gas flow separator 15 is affixed to the upstream wall 4 of the combustion chamber by a plurality of bolts 21 and may receive compressed oxidizer within the enclosure 22 from the enclosure 8 by openings (not shown) formed in the upstream separator end wall 19 and combustion chamber wall 4.

Downstream portions 17A and 18A of the outer and inner separator walls 17 and 18 are perforated by a plurality of holes 17B, 18B which enable oxidizer within the enclosure 22 to pass into the combustion chamber 5. The plurality of holes 17B, 18B extend in an axial direction of between of 0.3 and 0.5 of the respective axial lengths of the separator walls 17 and 18 from their respective downstream edges.

The external surfaces 17C and 18C of downstream portions of the separator walls 17 and 18 define axially extending channels 23 and 24, respectively starting at point 17D and 18D which are located between the upstream and downstream edges of the walls 17 and 18. The channels 23 and 24 are regularly spaced apart in a circumferential direction and each channel is located in a longitudinal plane which extends radially from the axis 1. Each channel 23 and 24 issues into the surface 20C of the downstream separator end wall 20. The channels 23 and 24 may be formed in the walls 17 and 18 by known forming processing such as by stamping or the like.

The channels 23 and 24 are each configured such that the depth P23A of the channel 23 where the channel begins upstream is less than the depth P23B at the downstream extremity of the channel, the depth P23 increasing in the direction from the P23A to P23B. Similarly, the depth P24 of each channel 24 also increases from its upstream value P24A to its downstream value P24B.

Additionally, the widths L23 and L24 of the channels 23 and 24 also increase from minimum upstream values L23A, L24A where each of the channels begin to maximum values L23B, L24B at their downstream extremities where they cross downstream separator end wall 20.

In the embodiment illustrated in FIGS. 2–4, the channels 23 and 24 are circumferentially aligned such that a longitudinal plane extending radially from the axis 1 will pass through both channels 23 and 24. As illustrated in FIG. 2, median planes M which extend along the axis 1 and extend radially therefrom, each pass through a channel 23 and a channel 24.

Figure 5:
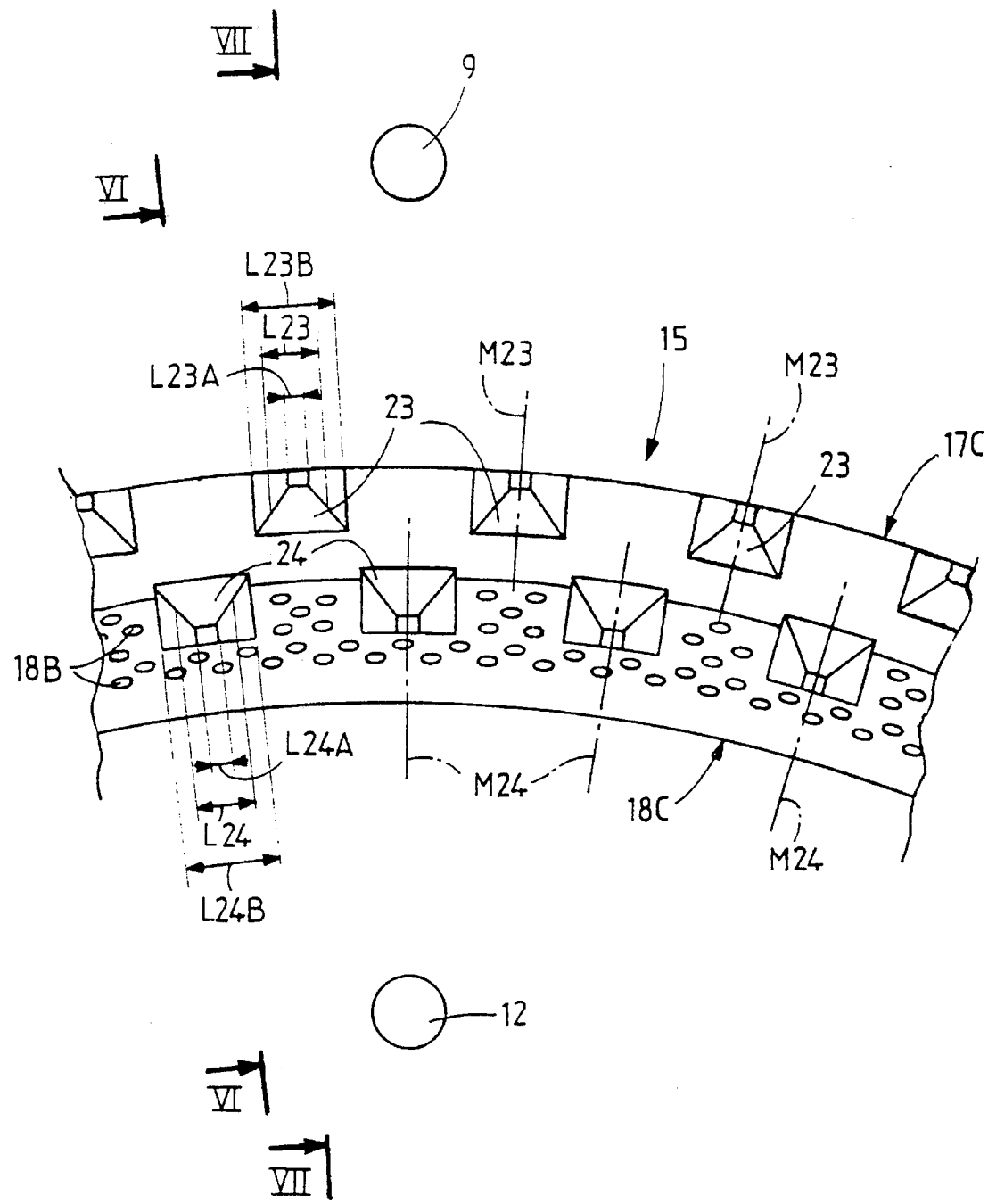
FIG. 5 is a partial, cross-sectional view taken along line V—V in FIG. 6 illustrating a second embodiment of the gas flow separator according to the present invention.
Figure 6:
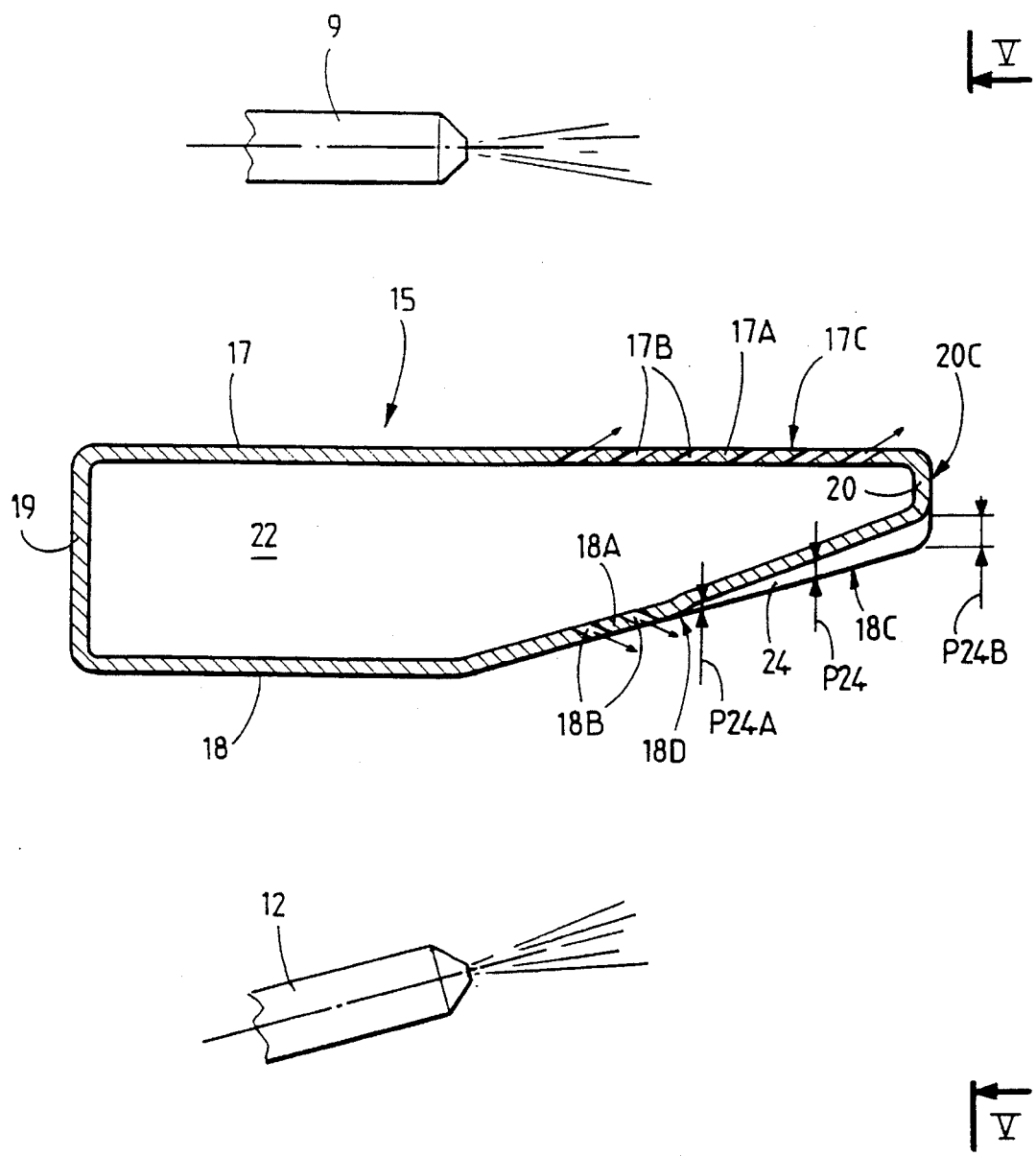
FIG. 6 is a cross-sectional view taken along line VI—VI in FIG. 5.
Figure 7:
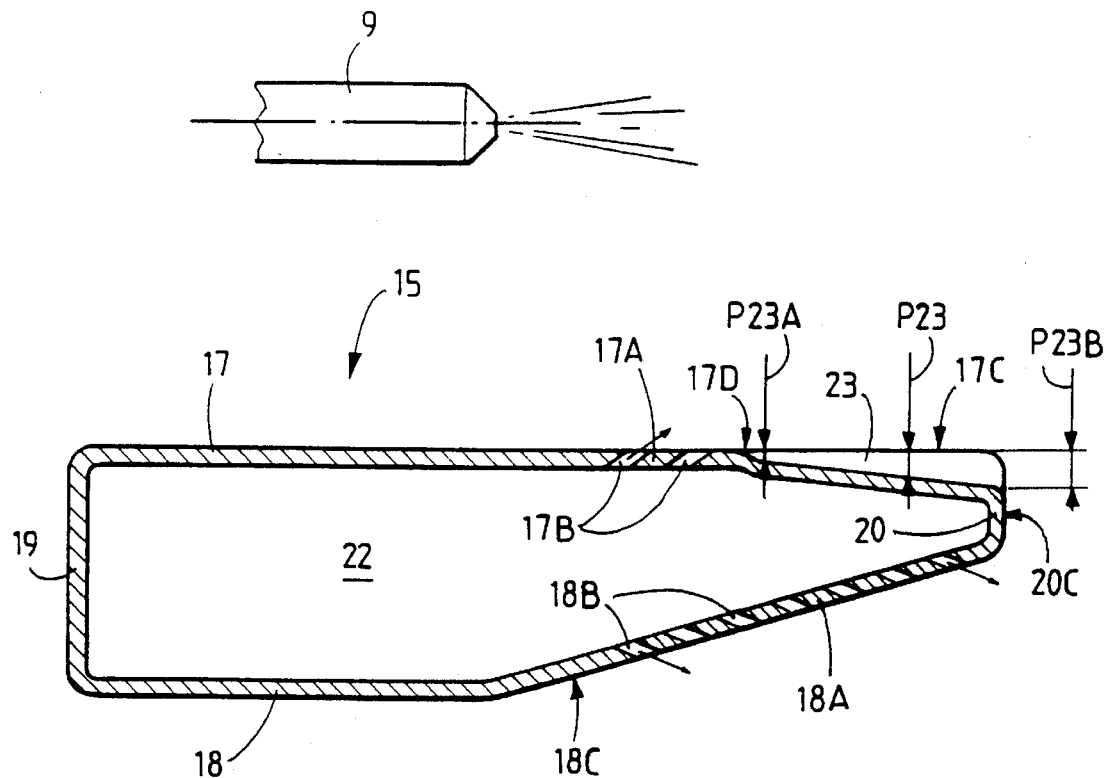
FIG. 7 is a cross-sectional view taken along line VII—VII in FIG. 5.
Figure 7:
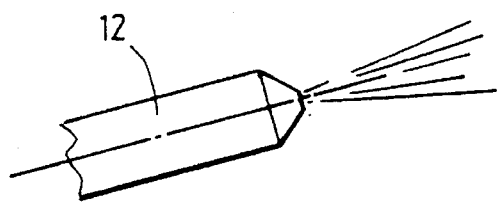
Figure 8:
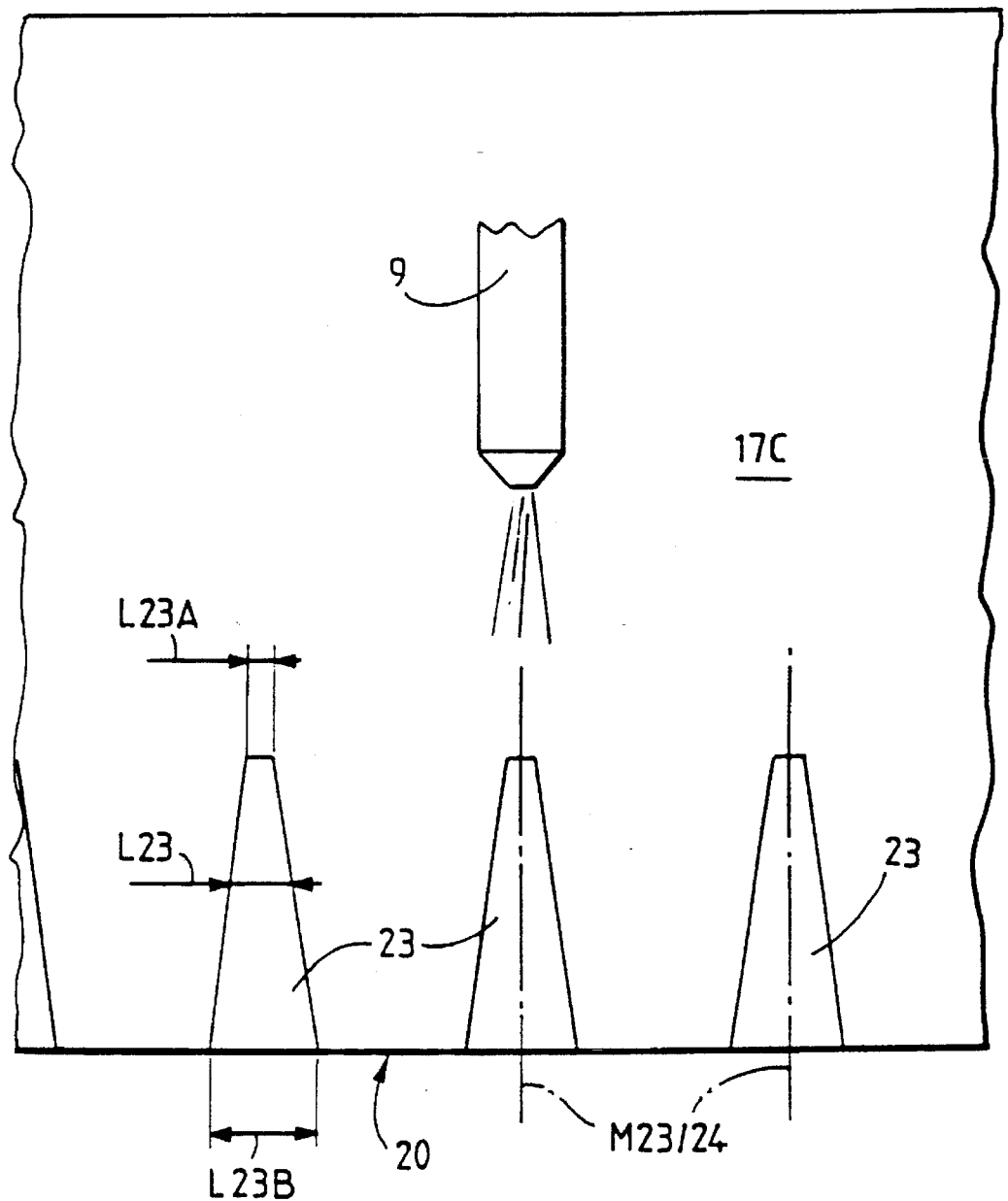
FIG. 8 is a partial top view taken in the direction of arrow F in FIG. 2 of the gas flow separator according to the present invention.

In the embodiment illustrated in FIGS. 5–7, the channels 23 and 24 are circumferentially offset from each other, as best seen in FIG. 5. In this instance, median planes M extending along the axis 1 and extending radially therefrom, each pass through only one of the channels 23 or 24. The median planes M of one channel of a first array is located equidistantly between the median planes of adjacent channels of the other array. The structure of the embodiment illustrated in FIGS. 5–7 is otherwise identical to that previously discussed in reference to the embodiment illustrated in FIGS. 2–4.

The main operational advantage of the gas flow separator according to the present invention is the creation of swirls in the gas flow within the combustion chamber by means of the channels 23 and 24. Such swirls enhance the gas mixing within the combustion chamber so as to improve flame propagation and to achieve a more homogenous temperature distribution across the cross-section of the combustion chamber. The flaring of the channels 23 and 24 is specially effective in achieving the operational improvement.

The foregoing description is provided for illustrative purposes only and should not be construed as in any way limiting this invention, the scope of which is defined solely by the appended claims.

We claim:

1. A gas flow separator for an annular combustion chamber of a gas turbine engine, the annular combustion chamber extending about a longitudinal axis of symmetry and bounded by an outer annular wall, an inner annular wall and an upstream end wall interconnecting the inner and outer annular walls, the gas turbine engine having two radially spaced, annular arrays of fuel injectors extending through the upstream end wall, the gas flow separator comprising:

a) a first separator wall extending about the longitudinal axis of symmetry and extending into the combustion chamber from the upstream end wall between the two radially spaced fuel injector arrays, the first separator wall having a first downstream edge and a plurality of circumferentially spaced apart first channels extending toward the upstream end wall from the first downstream edge, such that the axial lengths of the first channels are less than the axial length of the first separator wall;

b) a second separator wall radially spaced from the first separator wall, extending about the longitudinal axis of symmetry and extending into the combustion chamber from the upstream end wall between the two radially spaced fuel injector arrays, the second separator wall having a second downstream edge and a plurality of circumferentially spaced apart second channels extending toward the upstream end wall from the second downstream edge such that the axial lengths of the second channels are less than the axial length of the second separator wall; and c) a downstream separator end wall interconnecting the first and second downstream edges.

2. The gas flow separator of claim 1 wherein the depths of the first and second channels increase in a direction away from the upstream end wall of the combustion chamber.

3. The gas flow separator of claim 1 wherein the widths of the first and second channels increase in a direction away from the upstream end wall of the combustion chamber.

4. The gas flow separator of claim 3 wherein the depths of the first and second channels increase in a direction away from the upstream end wall of the combustion chamber.

5. The gas flow separator of claim 1 further comprising an upstream separator end wall interconnecting upstream portions of the first and second separator walls.

6. The gas flow separator of claim 1 wherein the first and second channels are circumferentially aligned such that a longitudinal plane extending radially from the axis of symmetry will pass through a first and a second channel.

7. The gas flow separator of claim 1 wherein the first and second channels are circumferentially offset from each other such that a longitudinal plane extending radially from the axis of symmetry will pass through only one of the first and second channels.

8. The gas flow separator of claim 1, wherein the gas flow separator is substantially annular about the axis of symmetry.

* * * * *